(12) United States Patent
Cody et al.

(10) Patent No.: US 9,476,526 B2
(45) Date of Patent: Oct. 25, 2016

(54) DUAL SEAL FLUID FITTING

(71) Applicant: GE Oil & Gas Pressure Control LP, Houston, TX (US)

(72) Inventors: Paul Eugene Cody, Houston, TX (US); Sergio Felipe Meyberg, Houston, TX (US); Andrew Browne Helvenston, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 107 days.

(21) Appl. No.: 14/248,986

(22) Filed: Apr. 9, 2014

(65) Prior Publication Data

US 2015/0292653 A1    Oct. 15, 2015

(51) Int. Cl.
| | |
|---|---|
| *F16L 15/04* | (2006.01) |
| *F16L 15/08* | (2006.01) |
| *E21B 33/068* | (2006.01) |
| *F16L 15/00* | (2006.01) |
| *F16L 19/02* | (2006.01) |
| *F16L 19/04* | (2006.01) |
| *F16L 41/00* | (2006.01) |
| *F16L 41/14* | (2006.01) |
| *F16L 55/07* | (2006.01) |

(52) U.S. Cl.
CPC ............ *F16L 15/04* (2013.01); *E21B 33/068* (2013.01); *F16L 15/008* (2013.01); *F16L 15/08* (2013.01); *F16L 19/02* (2013.01); *F16L 19/0212* (2013.01); *F16L 19/04* (2013.01); *F16L 41/008* (2013.01); *F16L 41/14* (2013.01); *F16L 55/07* (2013.01); *F16L 2201/40* (2013.01)

(58) Field of Classification Search
CPC ..... E21B 33/038; E21B 33/068; E21B 34/02
USPC .............................. 166/97.1; 137/511–543.23
See application file for complete search history.

(56) References Cited

U.S. PATENT DOCUMENTS

| 3,208,773 A | 9/1965 | Boudrie | |
| 3,933,174 A * | 1/1976 | Kanomata ................ | F16K 1/38 137/557 |
| 4,354,523 A | 10/1982 | Hochmuth et al. | |
| 4,699,356 A * | 10/1987 | Hargrove ................ | F16L 37/40 137/329.1 |

(Continued)

FOREIGN PATENT DOCUMENTS

| CN | 100554757 C | 10/2009 |
| EP | 0672817 A1 | 9/1995 |

(Continued)

OTHER PUBLICATIONS

International Search Report and Written Opinion issued in connection with corresponding PCT Application No. PCT/US2015/021647 dated Jul. 31, 2015.

*Primary Examiner* — Kevin Murphy
*Assistant Examiner* — Daniel P Donegan
(74) *Attorney, Agent, or Firm* — Bracewell LLP; James E. Bradley

(57) ABSTRACT

A fluid fitting for use with a hydrocarbon production device includes an annular fitting assembly inserted into a port formed in the hydrocarbon production device. A first outer diameter seal is located between the fitting assembly and the port. A packing assembly is located in an annulus between the fitting assembly and an inner surface of the port, defining a second outer diameter seal between the fitting assembly and the port.

11 Claims, 2 Drawing Sheets

(56) References Cited

U.S. PATENT DOCUMENTS

| | | | | |
|---|---|---|---|---|
| 4,809,129 | A * | 2/1989 | Hansen, III | F25B 41/00 137/392 |
| 5,472,216 | A * | 12/1995 | Albertson | F16J 15/3236 277/530 |
| 6,206,032 | B1 | 3/2001 | Hill | |
| 7,931,126 | B2 | 4/2011 | Croci | |
| 8,539,976 | B1 * | 9/2013 | Rodgers, Jr. | F16K 15/066 137/512 |
| 2002/0002351 | A1 * | 1/2002 | Cote, Sr. | A61M 39/26 604/247 |
| 2002/0189689 | A1 * | 12/2002 | Keast | F16K 17/0446 137/540 |
| 2003/0079784 | A1 * | 5/2003 | Toliusis | F16K 11/048 137/625.27 |
| 2005/0126638 | A1 * | 6/2005 | Gilbert | F16K 15/044 137/539 |
| 2006/0060247 | A1 * | 3/2006 | Whaley | B67D 3/043 137/539 |
| 2006/0102238 | A1 * | 5/2006 | Watson | F16L 29/007 137/613 |
| 2008/0210313 | A1 * | 9/2008 | Schniederjan | F16K 17/044 137/535 |
| 2010/0090456 | A1 | 4/2010 | Halaczkiewicz et al. | |
| 2010/0170571 | A1 | 7/2010 | Anderson et al. | |
| 2010/0200078 | A1 * | 8/2010 | Timko | F16K 5/0636 137/15.22 |

FOREIGN PATENT DOCUMENTS

| | | |
|---|---|---|
| FR | 2314429 A1 | 1/1977 |
| GB | 1519245 A | 7/1978 |

\* cited by examiner

DUAL SEAL FLUID FITTING

BACKGROUND

1. Field of Invention

This invention relates in general to fluid fittings, and in particular to fluid fittings for injecting fluids into, or sampling fluids from, pressurized spaces. More specifically, this invention relates in general to fluid fittings with multiple seals for use with hydrocarbon production devices.

2. Description of Prior Art

Fluid fittings are sometimes used to provide fluids within a pressurized space a path to the outside of the pressurized space, such as for fluid testing purposes. Fluid fittings are also sometimes used to inject fluids, such as a lubricant or packing material, into a pressurized space. Such fluid fittings typically have two leak paths. A leak can occur through the internal bore of the fluid fitting or along the outer diameter of the fitting, between the outside of the fitting and the inside of the port that extends through the sidewall of a hydrocarbon device and into the pressurized space, into which the pressure fitting is installed. Some known seals used in fluid fittings include elastomeric materials, which degrade and become ineffective when exposed to extreme hot or cold temperatures.

SUMMARY OF THE DISCLOSURE

There is a demand for systems which have dual seals for every leak path that are independently energized and can withstand extreme hot and cold temperatures. As an example, in hydrocarbon industry applications, there is a desire for hydrocarbon production devices, such as the wellhead, valves, and other flow control equipment, to be provided with two seals for every potential leak path. Systems and methods of this disclosure provide a fluid fitting with two independent seals in both the outer diameter leak path and the inner diameter leak path that is suitable for use in both extreme hot and extreme cold temperatures.

In an embodiment of this disclosure, a fluid fitting for use with a hydrocarbon production device includes an annular fitting assembly inserted into a port formed in the hydrocarbon production device. A first outer diameter seal is located between the fitting assembly and the port. A packing assembly is located in an annulus between the fitting assembly and an inner surface of the port, defining a second outer diameter seal between the fitting assembly and the port.

In an alternative embodiment of this disclosure, a fluid fitting for use with a hydrocarbon production device includes an annular fitting assembly inserted into a port formed in the hydrocarbon production device. An end of the fitting assembly is in sealing engagement with sidewalk of the port to define a seal between the fitting assembly and the port. The fitting assembly has external threads for engaging internal threads of the port. A packing assembly is located in an annulus between the fitting assembly and an inner surface of the port and defines another seal between the fitting assembly and the port. A packing gland circumscribes a portion of the fitting assembly for retaining the packing assembly in the annulus. The seal between the end of the annular fitting and the port is energized by releasably securing the fitting assembly into the port and the packing assembly is energized by threading the packing gland into the port.

In yet another embodiment of the current disclosure, a fluid fitting for use with a hydrocarbon production device includes an annular fitting assembly with a central passage inserted into a port formed in the hydrocarbon production device. An end of the fitting assembly is in sealing engagement with sidewalls of the port to define a first outer diameter seal between the fitting assembly and the port. A packing assembly is located in an annulus between the fitting assembly and an inner surface of the port, and that defines a second outer diameter seal between the fitting assembly and the port. The fluid fitting also includes a first and second inner diameter seal for sealing the central passage of the annular fitting assembly.

BRIEF DESCRIPTION OF THE DRAWINGS

Some of the features and benefits of the present invention having been stated, others will become apparent as the description proceeds when taken in conjunction with the accompanying drawings, in which.

DETAILED DESCRIPTION OF THE DISCLOSURE

Figure 1:
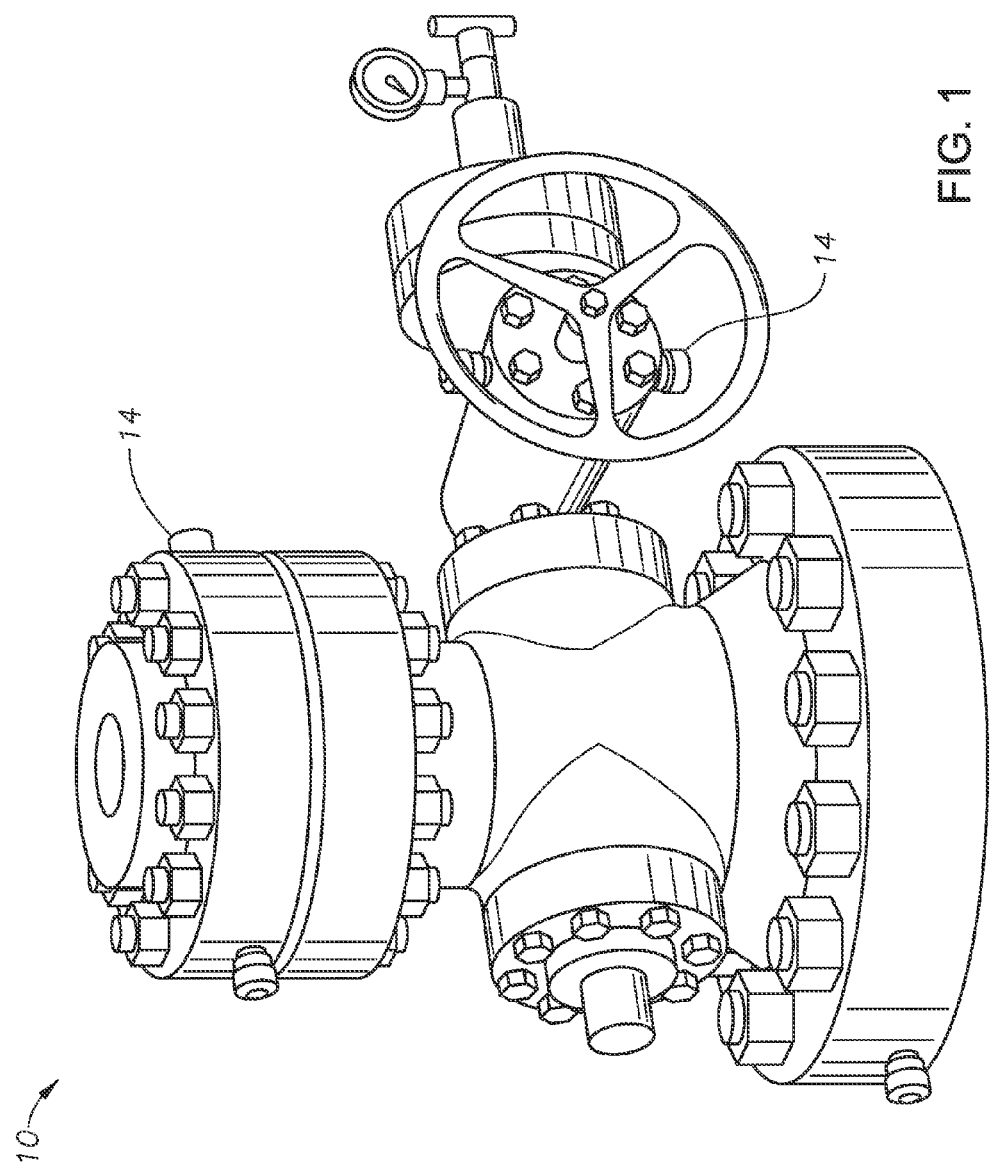
FIG. 1 is a perspective view of a portion of a hydrocarbon production device, the device using fluid fittings in accordance with embodiments of this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 2:
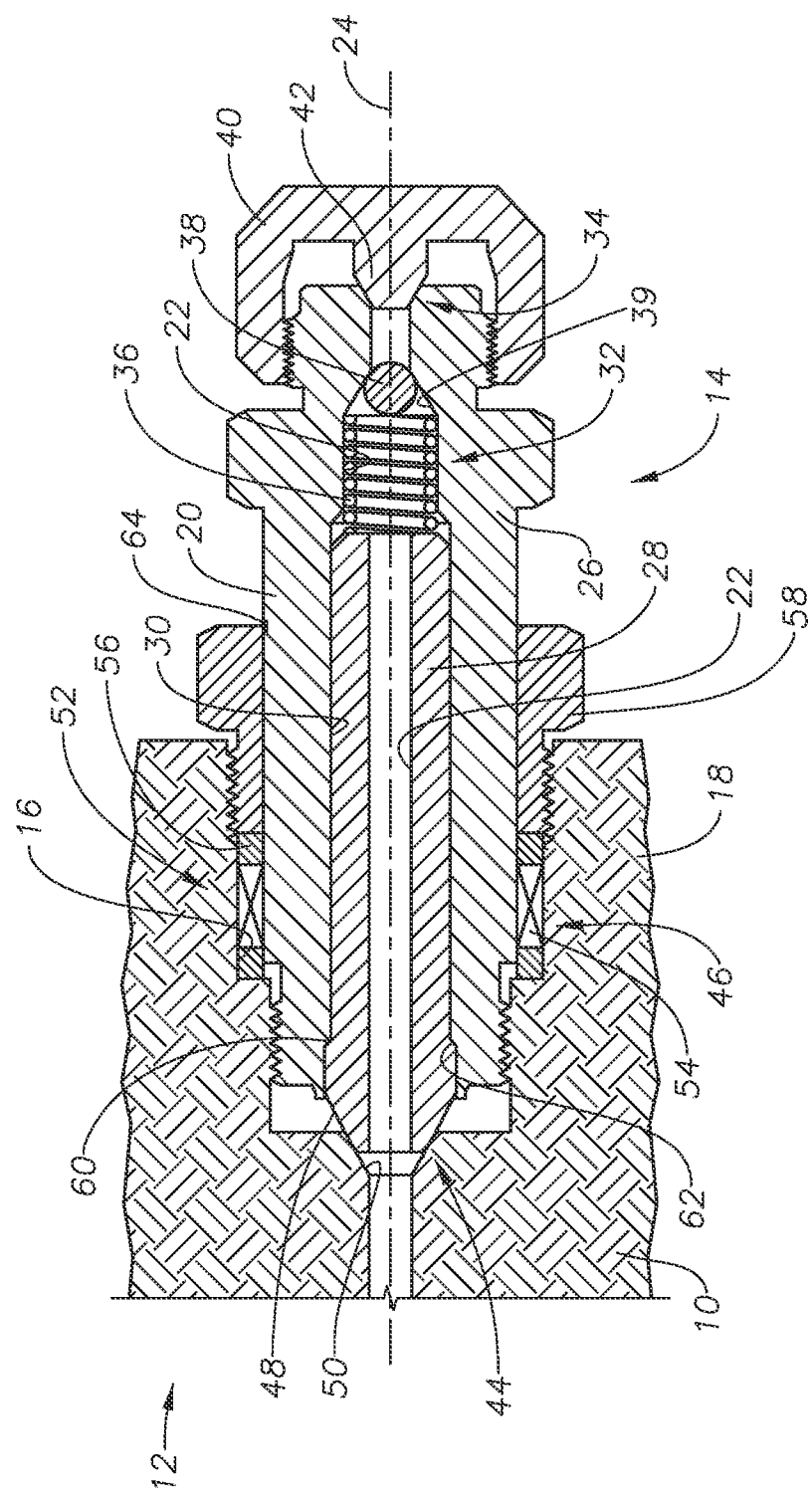
FIG. 2 is a section view of a fluid fitting in accordance with an embodiment of this disclosure.

Shown in FIG. 1 is hydrocarbon production device 10 that contains an internal pressurized space 12 (FIG. 2). As shown, hydrocarbon production device 10 is a portion of a wellhead assembly with a valve. In alternate embodiments, hydrocarbon production device 10 could be other pressure containing or flow control equipment used in the hydrocarbon industry. Turning to FIG. 2, an example of a fluid fitting 14 is shown located in port 16 that extends through sidewall 18 of hydrocarbon production device 10 and into pressurized space 12. In an embodiment, fluid fitting 14 provides a redundantly sealed fluid flow path into or out of pressurized space 12 by way of port 16 to allow an operator to sample fluids from within the pressurized space 12 or inject fluids into the pressurized space 12 while limiting leaks out of pressurized space 12.

Fluid fitting 14 includes fitting assembly 20. Fitting assembly 20 is annular with central passage 22 shown extending generally coaxially with an axis 24 of fitting assembly 20. Central passage 22 extends through fitting assembly 20 and provides the path for the fluids to flow from the pressurized space 12 to the outside of hydrocarbon production device 10. In the embodiment shown in FIG. 2, fitting assembly 20 includes a fitting body 26 and a fitting insert 28. Fitting body 26 has an internal bore 30 that is generally concentric with axis 24. Fitting insert 28 is an annular member located within the internal bore 30 of fitting body 26. In an embodiment, central passage 22 extends through fitting insert 28. In alternate embodiments, fitting assembly 20 can instead be a single member, in which case central passage 22 will be a continuous passage through fitting assembly 20. Fitting assembly 20 can be releasable secured within port 16. For example, fitting assembly 20 can have external threads on a first end for mating with first or inner internal threads of port 16.

Fluid fitting 14 has first and second inner diameter seals 32, 34 for sealing the fluid flow path along central passage 22 when fluids are not intentionally being sampled from, or injected into, pressurized space 12. In an example, each of first and second inner diameter seals 32, 34 are independently energized, that is, energized by different means, so that the failure of one of first and second inner diameter seals 32, 34 does not affect the function of the other. For example, first inner diameter seal 32 can be energized by a first energizing means that is different from a second energizing means that energizes the second inner diameter seal 34. This provides a redundant dual seal system for the potential leak path along central passage 22.

In the embodiment of FIG. 2, first inner diameter seal 32 includes biasing member 36, such as a spring, and ball 38. The diameter of central passage 22 transitions radially inward so that the portion of passage 22 proximate to a radial outer end of fitting assembly 20 has a reduced or smaller diameter than the portion of the passage 22 disposed radially inward. The transition of the diameter of the passage 22 is oblique to axis 24 and defines a seat 39 having a generally frusto-conical outer surface. Biasing member 36 is located within a portion of central passage 22 set radially inward from seat 39. One end of biasing member 36 engages a radially outer end of fitting insert 28, and the other end of biasing member 36 urges ball 38 into sealing engagement with seat 39. The outer surface of ball 38 seals against seat 39. Ball 38 and seat 39 can be formed of metal so that first inner diameter seal 32 is a metal to metal seal. Other non-elastomeric materials may be used to form seat 39 and ball 38 so that first inner diameter seal 32 is able to withstand and continue to operate without failure in extreme cold or extreme hot conditions such as, for example, temperatures in the range from −75 to +450 degrees Fahrenheit.

In the embodiment of FIG. 2, the second inner diameter seal 34 includes a cap 40 that is releasably secured to the outer end of fitting assembly 20. Cap 40 is a hollow member with a generally cylindrical outer surface and an opening on one end allowing access to the hollow space within. The outer end of fitting assembly 20 is shown inserted into the hollow space. Internal threads on an inner surface of the hollow space mate with external threads proximate to the outer end of fitting assembly 20 to secure cap 40 to fitting assembly 20. In alternate embodiments, other known connection means can be used to releasably secure cap 40 to the outer end of fitting assembly 20. A closed end of cap 40, opposite its open end, has a protruding member 42 with a tip that extends into the open space in cap 40, and that is in sealing engagement with the outer radial end of central passage 22. Cap 40 and the outer radial end of central passage 22 can both be formed of metal so that second inner diameter seal 34 creates a metal to metal seal. Other non-elastomeric materials may be used to form the outer radial end of central passage 22 and cap 40 so that second inner diameter seal 34 is able to withstand and continue to operate without failure in extreme cold or extreme hot conditions such as, for example, temperatures in the range from −75 to +450 degrees Fahrenheit. Cap 40 can be a vented cap with vents that extend through the closed end of cap 40 so that pressure cannot build up between cap 40 and fitting assembly 20.

Fluid fitting 14 can also include first and second outer diameter seals 44, 46 for sealing a fluid leak path between the outer surface of fitting assembly 20 and the inner surface of port 16. Each of the first and second outer diameter seals 44, 46 may be independently energized so that the failure of one of the first and second outer diameter seals 44, 46 does not affect the function of the other. For example, first outer diameter seal 44 can be energized by a first energizing means that is different from a second energizing means that energizes the second outer diameter seal 46. This provides a redundant dual seal system for the potential teak path between the outer surface of fitting assembly 20 and the inner surface of port 16.

In the embodiment of FIG. 2, fitting assembly 20 has a frusto-conically shaped nose 48 proximate to its inner radial end that faces away from the outer end of fitting assembly 20. When fluid fitting 14 is inserted in port 16, conical nose 48 sealingly mates with a frusto-conically shaped mating surface 50 of port 16, and defines the first outer diameter seal 44. Conical nose 48 and mating surface 50 can both be formed of metal so that first outer diameter seal 44 is a metal to metal seal. Other non-elastomeric materials may be used to form conical nose 48 and mating surface 50 so that first outer diameter seal 44 is able to withstand and continue to operate without failure extreme cold or extreme hot conditions such as, for example, temperatures in the range from −75 to +450 degrees Fahrenheit.

Second outer diameter seal 46 includes packing assembly 52. Packing assembly 52 circumscribes fitting assembly 20 and includes a sealing member 54. Sealing member 54 can be, for example, graphite packing, thermoplastic packing, or other non-elastomeric packing material that is able to withstand and continue to operate without failure in extreme cold and extreme hot conditions, such as, for example, temperatures in the range from −75 to +450 degrees Fahrenheit. In certain embodiments, packing assembly 52 can optionally include spacers 56 located on one or both sides of sealing member 54.

When fluid fitting 14 is located in port 16, an outer diameter annulus is defined between an outer surface of fitting assembly 20 and an inner surface of port 16. Packing assembly 52 is located within the outer diameter annulus to seal between the outer surface of fitting assembly 20 and the inner surface of port 16.

In an embodiment, fluid fitting 14 additionally includes packing gland 58. Packing gland 58 circumscribes a portion of fitting assembly 20. Packing gland 58 retains packing assembly 52 within the outer diameter annulus. Port 16 can have an internal shoulder that faces radially outward and is generally perpendicular to axis 24. Packing assembly 52 can be located between the internal shoulder of port 16 and an end of packing gland 58. In certain embodiments, packing assembly 52 can be compressed between the internal shoulder of port 16 and the end of packing gland 58. Packing gland 58 can be releasably secured in port 16. For example, packing gland 58 can have a connector such as, for example, external threads for mating with internal second or outer threads of port 16 (FIG. 2) or a snap ring (not shown), or other known connectors for releasably securing packing glad 58 into port 16. When fluid fitting 14 is located within port 16, packing assembly 52 will be located axially between the first internal threads and the connector of packing gland 58. In the embodiment of FIG. 2, packing assembly 52 is located axially between the first internal threads second internal threads of port 16, that is, axially between the external threads of fitting assembly 20 and the external threads of packing gland 58. Spacers 56, when included, will prevent packing assembly 52 from interfering with the threaded connections between port 16 and fluid fitting 14 and the connector of packing gland 58.

In an example of operation, an operator first assembles packing gland 58 and packing assembly 52 onto the outer diameter of the fitting assembly 20. The operator then inserts fitting assembly 20 into port 16. Biasing member 36 has been located within central passage 22 with one end of biasing member 36 engaging an end of fitting insert 28 and the other end of biasing member 36 engaging ball 38, urging ball 38 into sealing engagement with seat 39. Fitting assembly 20 can be threaded into port 16, using the external threads of fitting assembly 20 and the first or inner internal threads of port 16. As fitting assembly 20 is threaded into port 16, conical nose 48 of fitting assembly 20 will mate with conical mating surface 50 of port 16, creating the first outer diameter seal 44 between fitting assembly 20 and port 16. Cap 40 is threaded on fitting assembly 20 so that the tip of protruding member 42 is in sealing engagement with the end of central passage 22.

In the embodiment of FIG. 2, fitting insert 28 has a circumferential frusto-conically shaped shoulder 60 on the outer surface of fitting insert 28, the outer diameter of conical shoulder 60 increasing with distance away from cap 40. Conical shoulder 60 mates with a complementary shaped mating frusto-conically shaped shoulder 62 on internal bore 30. When fitting assembly 20 is fully threaded into port 16, conical shoulder 60 is sealingly engaged with mating conical shoulder 62, creating a seal between internal bore 30 and fitting insert 28. Any fluids that pass through central passage 22 and into any space between internal bore 30 and fitting insert 28 will be prevented from passing the seal formed by conical shoulder 60 and mating conical shoulder 62 and reaching the space between fitting assembly 20 and port 16. Therefore, the seal formed by conical shoulder 60 and mating conical shoulder 62 works together with the first and second outer diameter seals 44, 46 to prevent fluids from escaping along the leak path between fitting assembly 20 and port 16.

Packing assembly 52 can then be inserted into port 16 around fitting assembly 20. Packing assembly 52 will be located within the outer diameter annulus. Packing gland 58 can be releasably secured to port 16, such as by threading packing gland 58 into port 16 using the external threads of packing gland 58 and the second or outer threads of port 16, to retain packing assembly 52 within the outer diameter annulus. When sealing member 54 is a compressed packing mater al packing gland 58 be inserted into port 16 to compress packing assembly 52 between the end of packing gland 58 and the internal shoulder of port 16.

An optional position indicator 64, such as a crotch or coloring, is shown provided on the external surface of fitting assembly 20 so that the operator can visualize the relative positions between fitting assembly 20 and packing gland 58 and know when packing gland 58 is inserted far enough into port 16.

When pressure space 12 is pressurized first and second outer diameter seals 44, 46, together with the seal formed by conical shoulder 60 and mating conical shoulder 62 prevent fluids from escaping along the leak path between fitting assembly 20 and port 16. First and second inner diameter seals 32, 34 prevent fluids from escaping along the leak path of central passage 22. Embodiments of this disclosure therefore provide fluid fitting 14 with redundantly sealed leak paths with independently energized seals that are able to withstand extreme hot and extreme cold conditions.

The terms "vertical", "horizontal" "upward", "downward", "above", and "below" and similar spatial relation terminology are used herein only for convenience because elements of the current disclosure may be installed in various relative positions.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

What is claimed is:

1. A hydrocarbon production device comprising:
    a production device housing;
    a port in the housing, the port having a larger diameter portion and a smaller diameter portion, the larger diameter portion having an axis and extending inward into the housing from an exterior of the housing to an outward facing shoulder, the smaller diameter portion extending inward from the outward facing shoulder;
    an annular fitting assembly having external fitting assembly threads secured to mating internal fitting assembly threads in the larger diameter portion;
    a passage extending axially through the fitting assembly;
    a first outer diameter seal located between an inner end of the fitting assembly and the outward facing shoulder, the first outer diameter seal being energized by an inward axial force on the first outer diameter seal in response to the external fitting assembly threads engaging the internal fitting assembly threads;
    a packing assembly in an annulus between the fitting assembly and an inner surface of the larger diameter portion of the port outward from the external fitting assembly threads;
    a packing gland having external packing gland threads that engage mating internal packing gland threads in the larger diameter portion outward from the internal fitting assembly threads, the packing gland having an inner end that engages and exerts an axial force on the packing assembly in response to securing the external packing gland threads to the internal packing gland threads, defining a redundant second outer diameter seal between the fitting assembly and the port; and
    a ball urged by a spring into sealing engagement with a seat in the passage, defining a first inner diameter seal.

2. The device of claim 1, wherein the first outer diameter seal comprises:
    a conical surface located at an intersection of the smaller diameter portion with the outward facing shoulder; and
    a conical nose on the inner end of the fitting assembly that seals against the conical surface.

3. The device of claim 1, wherein the fitting assembly comprises:
    a fitting body with a bore having an internal shoulder;
    a tubular fitting insert positioned in the bore, the fitting insert having an external shoulder that abuts the internal shoulder to limit outward axial movement of the fitting insert in the bore, the passage extending through the fitting insert; and the first outer diameter seal comprises:
a conical shoulder on the fitting insert that engages a mating conical shoulder on the outward facing shoulder.

4. The device of claim 3, wherein:
the engagement of the internal shoulder in the bore with the external shoulder on the fitting insert comprises a sealing engagement.

5. The device of claim 1, wherein:
the larger diameter portion has a packing assembly shoulder;
the packing assembly has an inner end that abuts the packing assembly shoulder; and
the packing assembly includes a sealing member located between two spacers.

6. A hydrocarbon production device comprising:
a production device housing;
a port in the housing, the port having a larger diameter portion and a smaller diameter portion, the larger diameter portion having an axis and extending inward into the housing from an exterior of the housing to an outward facing shoulder, the smaller diameter portion extending inward from the outward facing shoulder;
an annular fitting assembly having external fitting assembly threads secured to mating internal fitting assembly threads in the larger diameter portion;
a passage extending axially through the fitting assembly;
a first outer diameter seal located between an inner end of the fitting assembly and the outward facing shoulder, the first outer diameter seal being energized by an inward axial force on the first outer diameter seal in response to the external fitting assembly threads engaging the internal fitting assembly threads;
a packing assembly in an annulus between the fitting assembly and an inner surface of the larger diameter portion of the port outward from the external fitting assembly threads;
a packing gland having external packing gland threads that engage mating internal packing gland threads in the larger diameter portion outward from the internal fitting assembly threads, the packing gland having an inner end that engages and exerts an axial force on the packing assembly in response to securing the external packing gland threads to the internal packing gland threads, defining a redundant second outer diameter seal between the fitting assembly and the port; and
a cap releasably secured to an outer end of the fitting assembly, the cap having a protruding member for sealing engagement with an outer end of the passage of the fitting assembly.

7. The device of claim 6, wherein the fitting assembly comprises:
a fitting body with a bore having an internal shoulder;
a tubular fitting insert in the bore, the fitting insert having an external shoulder that engages the internal shoulder in the bore, the passage extending through the fitting insert;
the inner end of the fitting assembly comprises a conical nose on an inner end of the fitting insert, the axial force caused by the engagement of the external fitting assembly threads with the internal fitting assembly threads passing through the internal shoulder, the external shoulder and the nose to the outward facing shoulder; and wherein the device further comprises:

a seat formed in the bore;
a ball in the bore; and
a spring in engagement with an outer end of the insert and the ball to urge the ball into sealing engagement with the seat.

8. A hydrocarbon production device comprising:
a production device housing;
a port in the housing, the port having a larger diameter portion and a smaller diameter portion, the larger diameter portion having an axis and extending inward into the housing to an outward facing shoulder, the smaller diameter portion extending inward from the outward facing shoulder, the port having a conical sealing surface at the outward facing shoulder;
an annular fitting body having external fitting body threads secured in mating internal fitting body threads in the larger diameter portion, the annular fitting body having an axially extending bore extending from an inner end to an outer end of the annular fitting body, the bore having an internal shoulder and an inward facing seat outward from the internal shoulder;
a tubular fitting insert within the bore, the fitting insert having an external shoulder that abuts the internal shoulder, the fitting insert having a conical nose on an inner end that protrudes past the inner end of the annular fitting body, the engagement of the external fitting body threads with the mating internal fitting body threads exerting an inward axial force on the nose of the fitting insert against the conical sealing surface of the port;
a central passage extending axially through the fitting insert from the nose to an outer end of the fitting insert;
a ball located in the bore between the outer end of the fitting insert and the seat;
a spring in engagement with the outer end of the fitting insert and the ball, urging the ball into sealing engagement with the seat;
an outward facing packing assembly shoulder in the larger diameter portion outward from external fitting body threads;
a packing assembly in an annulus between the fitting body and the larger diameter portion of the port, the packing assembly having an inner end in abutment with the packing assembly shoulder;
a packing gland having external packing gland threads that engage mating internal packing gland threads in the larger diameter portion, the packing gland having an inner end that abuts the packing assembly, the engagement of the external packing gland threads with the internal packing gland threads exerting an inward axial force on the packing gland; and
a cap secured to the outer end of the fitting body and having an inward extending protrusion that seals to the bore at a point outward of the ball and the seat.

9. The device of claim 8, wherein each of the first and second outer diameter seals are formed of a material that is able to operate in temperatures in a range from −75 to +450 degrees Fahrenheit.

10. The device of claim 8, wherein the inner end of the fitting body is spaced outward from the outward facing shoulder by a gap.

11. The device of claim 8, wherein the engagement of the internal shoulder in the bore with the external shoulder on the fitting insert comprises a sealing engagement.

* * * * *